United States Patent
McDevitt-Pimbley et al.

(10) Patent No.: US 9,142,127 B1
(45) Date of Patent: Sep. 22, 2015

(54) SYSTEMS AND METHODS FOR TRAFFIC GUIDANCE NODES AND TRAFFIC NAVIGATING ENTITIES

(71) Applicant: Maxwell Consulting, LLC, Croton on Hudson, NY (US)

(72) Inventors: David Alan McDevitt-Pimbley, Croton on Hudson, NY (US); Joseph Maxwell Pimbley, Croton on Hudson, NY (US)

(73) Assignee: Maxwell Consulting, LLC, Croton on Hudson, NY (US)

( * ) Notice: Subject to any disclaimer, the term of this patent is extended or adjusted under 35 U.S.C. 154(b) by 0 days.

(21) Appl. No.: 14/264,541

(22) Filed: Apr. 29, 2014

(51) Int. Cl.
| | |
|---|---|
| G08G 1/09 | (2006.01) |
| G08G 1/07 | (2006.01) |
| G08G 1/052 | (2006.01) |
| G08G 1/01 | (2006.01) |

(52) U.S. Cl.
CPC .............. *G08G 1/091* (2013.01); *G08G 1/0104* (2013.01); *G08G 1/052* (2013.01); *G08G 1/07* (2013.01)

(58) Field of Classification Search
CPC ....... G08G 1/091; G08G 1/07; G08G 1/0104; G08G 1/052
USPC .......................................... 701/118, 117, 119
See application file for complete search history.

(56) References Cited

U.S. PATENT DOCUMENTS

| | | | |
|---|---|---|---|
| 1,251,666 A | 1/1918 | Hoge | |
| 6,337,640 B2 | 1/2002 | Lees | |
| 6,466,862 B1 * | 10/2002 | DeKock et al. | 701/117 |
| 6,754,580 B1 | 6/2004 | Ask et al. | |
| 7,397,390 B2 | 7/2008 | DiPazza | |
| 8,352,111 B2 | 1/2013 | Mudalige | |
| 2002/0008637 A1 * | 1/2002 | Lemelson et al. | 340/907 |
| 2007/0115139 A1 * | 5/2007 | Witte et al. | 340/909 |
| 2008/0071465 A1 * | 3/2008 | Chapman et al. | 701/117 |
| 2008/0172171 A1 * | 7/2008 | Kowalski | 701/118 |
| 2010/0026520 A1 * | 2/2010 | Witte et al. | 340/908 |
| 2010/0256836 A1 | 10/2010 | Mudalige | |
| 2011/0043378 A1 * | 2/2011 | Bailey et al. | 340/917 |
| 2011/0140924 A1 * | 6/2011 | Sennett et al. | 340/944 |
| 2011/0156924 A1 * | 6/2011 | Nadeem et al. | 340/905 |
| 2011/0182475 A1 | 7/2011 | Fairfield et al. | |
| 2012/0083959 A1 | 4/2012 | Dolgov et al. | |
| 2012/0083960 A1 | 4/2012 | Zhu et al. | |
| 2012/0083964 A1 | 4/2012 | Montemerlo et al. | |
| 2012/0323474 A1 * | 12/2012 | Breed et al. | 701/117 |
| 2013/0332058 A1 * | 12/2013 | Prestor et al. | 701/118 |
| 2014/0070963 A1 * | 3/2014 | DeLorean | 340/917 |

FOREIGN PATENT DOCUMENTS

| | | |
|---|---|---|
| WO | WO 2008/014218 A2 | 1/2008 |
| WO | WO 2011/115587 A1 * | 9/2011 ............. G08G 1/017 |

OTHER PUBLICATIONS

Miche et al.; The Internet of Vehicles or the Second Generation of Telematic Services; ERCIM News, No. 77—Special Theme: Future Internet Technology; Apr. 2009; 4 pages.

* cited by examiner

*Primary Examiner* — Mary Cheung
*Assistant Examiner* — Brian P Sweeney
(74) *Attorney, Agent, or Firm* — Daly, Crowley, Mofford & Durkee, LLP (57) ABSTRACT

A system includes one or more traffic guidance nodes (TGNs) and one or more mobile traffic navigating entities (TNEs). The traffic guidance nodes transmit updated information about the local traffic to the one or more mobile traffic navigating entities when the one or more mobile traffic navigating entities are within a range of the one or more traffic guidance nodes.

23 Claims, 6 Drawing Sheets

SYSTEMS AND METHODS FOR TRAFFIC GUIDANCE NODES AND TRAFFIC NAVIGATING ENTITIES

FIELD

This disclosure relates to traffic systems and, more particularly, to traffic elements that communicate traffic information.

BACKGROUND

Vehicle automation systems involve the use of mechatronics and/or artificial intelligence to automatically assist a driver operating a vehicle. Such automation systems can provide a driver with information or other tools to assist in navigation, or can fully or partially operate the vehicle. Systems that fully or partially operate the vehicle include airplane autopilot systems, underwater pipeline inspection systems, collision detection systems that operate automotive brakes to avoid an accident, etc. Systems that provide a driver with information or other tools to aid in navigation include rear-view alarms and cameras, automatic traction control systems, anti-lock braking systems, etc.

To date, vehicle automation systems that operate or navigate the land-based vehicles such as cars or trucks have not seen wide use. This is due, at least in part, to a lack of land-based infrastructure for guiding automated vehicles along the roadways.

SUMMARY

A system includes one or more stationary traffic guidance nodes (TGNs). The TGNs may include a receiver to receive information about local traffic, one or more sensors to detect local traffic activity and generate information about local traffic activity, a memory to store the information about local traffic, and a transmitter to broadcast the information about local traffic.

The system may also include one or more mobile traffic navigating entities (TNEs). The TNEs may include a receiver to receive the information from the one or more traffic guidance nodes when the traffic navigating entity is within a proximity of the one or more traffic guidance nodes, one or more sensors to detect local traffic activity and generate information about local traffic activity, a memory to store the information about the local traffic activity, and a transmitter to send the information about the local traffic activity to other mobile traffic navigating entities and to the one or more stationary traffic guidance nodes.

The stationary traffic guidance nodes may transmit updated information about the local traffic to the one or more mobile traffic navigating entities when the one or more mobile traffic navigating entities are within a range of the one or more stationary traffic guidance nodes.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

Figure 1:
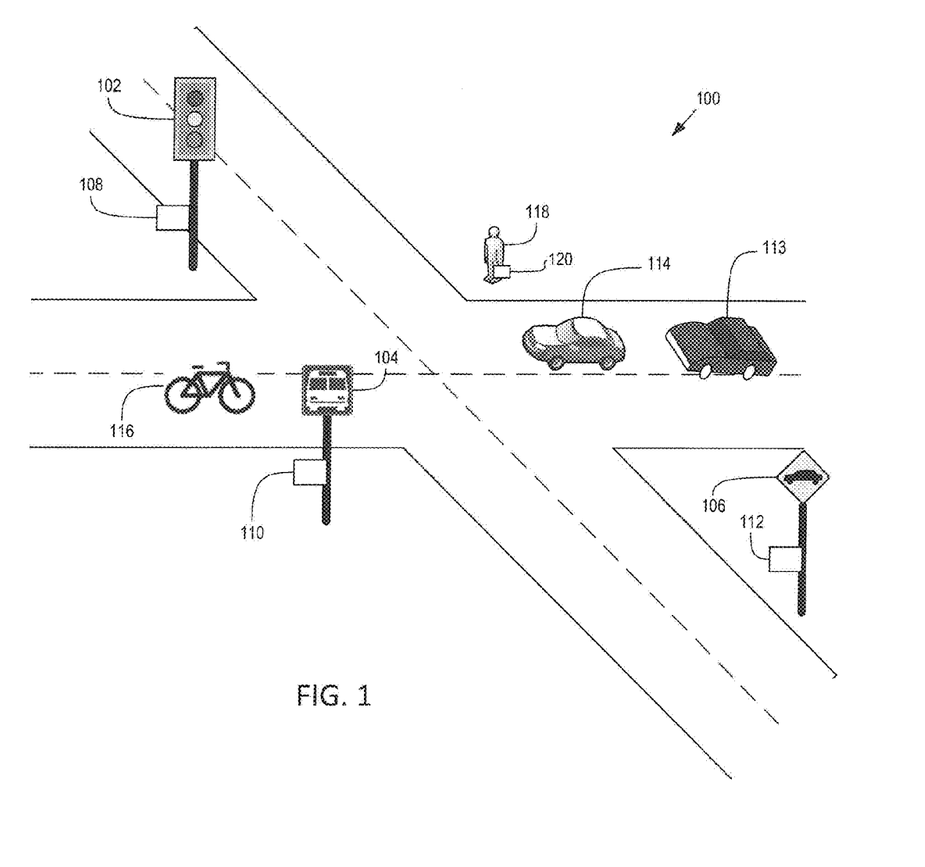
FIG. 1 is a pictorial view of a system for traffic guidance.

Referring now to FIG. 1, a system 100 for enhancing traffic safety is shown. System 100 includes one or more traffic guidance nodes ("TGNs"), including stoplight TGN 102, bus stop TGN 104, and traffic sign TGN 106. Other types of TGNs include, but are not limited to: construction signs, street- or highway-side signs, street- or highway-side advertisements, bus stops, fire hydrants, parking meters, buildings, stop signs, yield signs, highway signs, any type of traffic-related sign, or any stationary object near or adjacent to vehicular traffic. In embodiments, TGNs can also include movable objects such as police cruisers, aircraft such as traffic or news helicopters or airplanes and the like, hand-held construction or traffic signs, construction vehicles, helicopters, aerial drones, satellites, etc. that are not necessarily near or adjacent to vehicular traffic.

A TGN may include a traffic processing module (e.g. traffic processing modules 108, 110, and 112). The traffic processing module may be a computing device having a processor and software instructions stored in a hardware-based storage device (such as a RAM, ROM, hard drive, etc.). The instructions, when executed by the processor, may cause the traffic processing module to provide features and perform functions as described below. The traffic processing module may also be an ASIC (i.e. Application Specific Integrated Circuit), a circuit, a combination of circuits and processors, a computing device such as a laptop, a mobile computing device such as an Android stick, etc.

The traffic processing module may also include one or more transmitters and receivers. The transmitters and receivers may be configured to communicate over a wireless network, a wired network, a cellular network, a personal area network (such as a Bluetooth® network, for example), or any type of communication network. Additionally or alternatively, one or more of the transmitters may be configured to wirelessly broadcast information and data. Such transmissions can include transmissions over any application broadcast band, including, but not limited to, emergency bands, commercial radio bands, longwave, AM radio, shortwave, VHF, FM radio, UHF, etc.

The TGNs may also comprise or be coupled to sensors to detect local traffic in and around the TGN. These sensors can include piezo-electric elements and/or inductive loops sensors embedded in road pavement, pneumatic road tubes, cameras to detect traffic on the street, radar employing any electromagnetic wavelength with source and receiver as freestanding nodes or incorporated within the TGN, sonar employing any acoustic frequency with source and receiver as freestanding nodes or incorporated within the TGN, etc.

The TGNs can also include a traffic guidance indicator that the TGN uses to provide visual or audible cues or guidance to traffic. For example, stoplight TGN 102 includes traffic guidance indicators such as green, yellow, and red lights, turn arrows, and the like, that provide audible or visual guidance to traffic. A crosswalk TGN may include traffic guidance indicators such as illuminated walk signals, audible signals indicating when it is safe to cross the street, etc. The face of a stop sign or other type of sign may also be considered a traffic guidance indicator.

In embodiments, the TGNs can change a state of their traffic guidance indicators in response, for example, to sensing nearby traffic. For example, if a stoplight TGN senses a vehicle approaching in one direction and no vehicles approaching in other directions, the TGN may switch its light to green to allow the vehicle to travel through the intersection. As another example, a stoplight may switch to flashing yellow or flashing red if there is an accident nearby or if traffic should be otherwise slowed, stopped, or re-routed. Similarly, if a crossing sign TGN detects a nearby pedestrian, the crossing sign may communicate with the stoplight TGN and request the stoplight TGN to alter its state so that the pedestrian can cross the street. Once the stoplight has stopped traffic and it is safe for the pedestrian to cross, the crossing sign TGN may indicate to the pedestrian that it is safe to cross the street by illuminating a walk signal, making an audible sound, etc.

FIG. 1 also includes traffic navigating entities ("TNEs"), such as road vehicle 113, autonomous road vehicle 114, bicycle 116, and pedestrian 118. Each THE may include a processing module that can receive traffic-related information from the TGNs. For example, pedestrian 118 may carry a smart phone 120 or another type of computing device (such as a tablet, laptop, etc.) that can store and execute software to receive and process information from the TGNs. Similarly, bicycle 116 and road vehicles 113 and 114 may include bicycle computers or in-vehicle computers (respectively) to receive and process information from the TGNs. The computing device may have a receiver to receive information broadcast by the TGNs. Additionally or alternatively, the computing devices may have radios, network adapters, or other types of transceivers that allow them to receive information from and provide information to the TGNs.

The computing devices associated with the TNEs may also include displays that provide traffic information to a user. In embodiments, the computing devices also have speakers that can provide audible information to the user about traffic information. The speakers may provide an alarm, a voice that recites traffic information, etc.

The computing devices associated with TNEs (and with TGNs) may include global positioning systems (GPS), gyroscopes, or other features for determining the position of the TNEs and TGNs. In various embodiments, stationary TGNs (such as stoplight TGN 102) may not need GPS location systems because their location is known and does not change.

TNEs may include other types of traffic navigating entities including, but not limited to, mopeds, motorcycles, trucks, construction vehicles, skateboards, working or seeing-eye dogs, or any other type of entity that may navigate road traffic.

Figure 2:
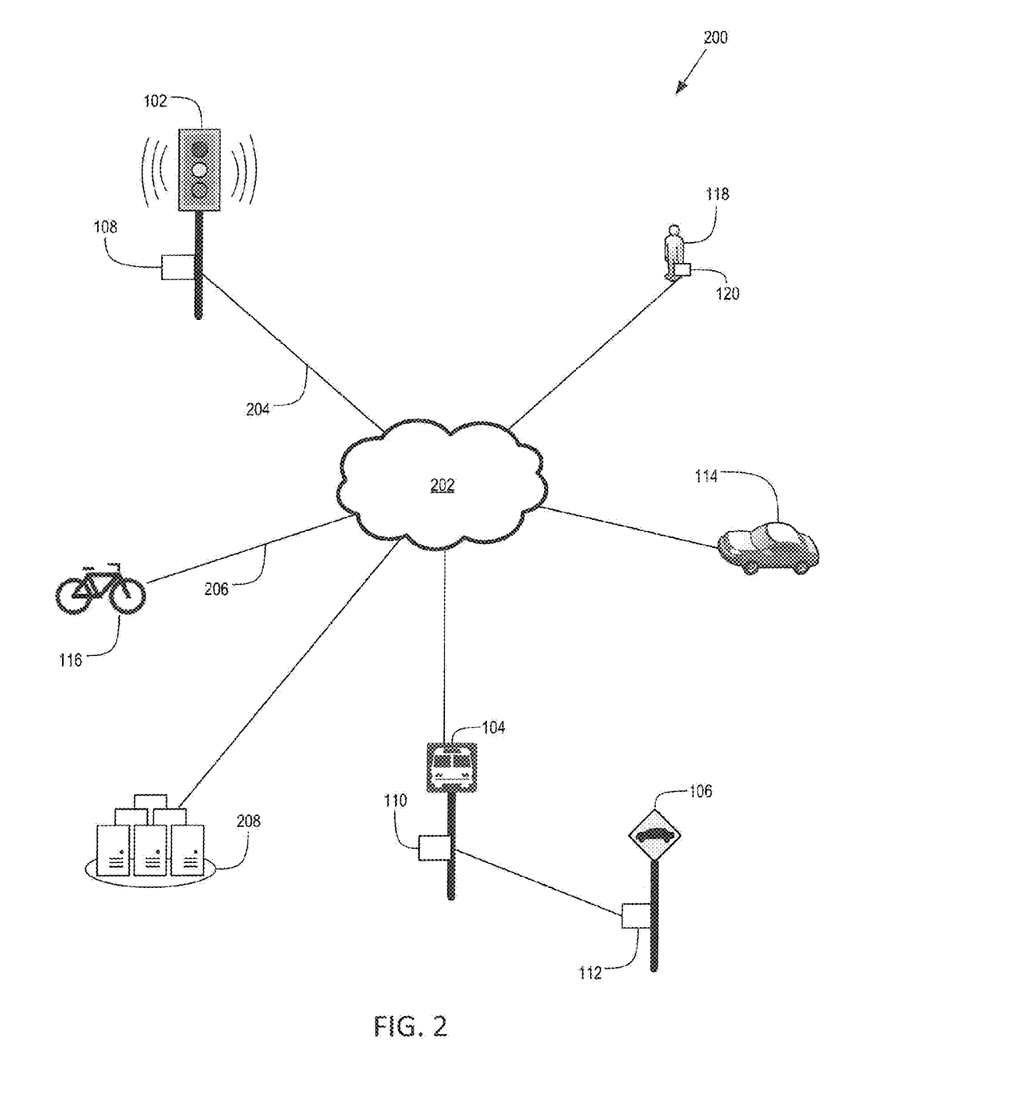
FIG. 2 is a block diagram of a system for traffic guidance including a network.

Referring to FIG. 2, traffic guidance system 200 may be the same as or similar to traffic guidance system 100 in FIG. 1. As shown, traffic guidance system 200 includes a network 202 that allows TGNs 102, 104, and 106 to communicate with each other, and with TNEs 114, 116, and 118. Network 202 may be a wired network, or a wireless network, or a combination thereof. In an embodiment, network 202 may be a wide area network, a city-wide network, a local area network, a personal area network, a radio broadcast network, etc. Network 202 may have a geographic scope large enough to communicate relevant traffic information to TGNs and TNEs in the traffic area. As such, network 202 may cover a street, an intersection, a city block, a stretch of highway, a highway exit- or on-ramp, a city, or any other geographic area having traffic.

Although not shown, network 202 may be extended and/or connected to other networks and other TGNs and/or TNEs in different areas. TGNs 102, 104, and 106 may be connected to the network 202 via wireless connections or wired connections.

The network connections connecting the TGNs and TNEs to network 202 may be bidirectional or unidirectional connections. For example, connection 204 connecting stoplight TGN 102 to network 202 may be a bidirectional connection allowing stoplight TGN 102 to receive information from and send information to other TGNs and TNEs via network 202. As another example, network connection 206 connecting bicycle TNE 116 to network 202 may be unidirectional to allow bicycle TNE 116 to either receive information from or send information to other TGNs and TNEs via network 202.

In embodiments, the TNEs and TGNs can send data and information to each other to facilitate travel. The data can include identifying information, such as a unique identifier of the TNE or TGN, location information, traffic information, etc. For example, a TNE that is traveling down a roadway can send data to nearby TGNs that identifies the TNE via a unique identifier, identifies the type of TNE (bicycle, pedestrian, vehicle, etc.), identifies the TNE's direction and speed of travel, identifies any road hazards detected by the TNE, etc. The TNE can also send information about other TNEs, pedestrians, or vehicles to the TGN. If a TNE detects (or receives information about) a traffic event, such as another TNE that has been in an accident or is otherwise disabled for example, the first TNE can store and transmit information about the accident or disabled vehicle to other TGNs and TNEs that it encounters as it continues to travel. In response, the other TGNs and TNEs that receive the information may also relay the information to other TGNs and TNEs in order to propagate the information to any TGNs and TNEs in the area. In an embodiment, the information may continue to spread to any TGNs and TNEs within a predetermined distance or radius from the event.

In another embodiment, a helicopter TGN that detects an accident can send information about the accident to TNEs in the area so that the TNEs can avoid the hazard. If the TNE is autonomous, the TNE may use the information to re-route its travel path, for example.

TNEs may also request that a TGN change a state of a traffic guidance indicator. For example, a vehicle TNE that is approaching a stoplight TGN that is showing a red light may send a communication to the stoplight TGN requesting it change the state of the light to green. Similarly, if a vehicle TNE is in an accident or if a pedestrian TNE requires medical assistance, for example, the TNE may send a request to nearby TGNs to alter traffic around the accident, or to clear traffic away from the pedestrian, or to alert emergency responders. Depending upon local traffic patterns, the TGN may comply with the TNE's request and change the state of its traffic guidance indicator, or may continue operating without changing its state. Although a stoplight is used in this example, TNEs can request changes in state from any type of TGN that can change the state of its traffic guidance indicator, such as stoplights, crossing signs, billboards, traffic or highway signs that display text on a display, and the like.

In various embodiments, the signal strength, frequency, and radius of the transmissions from a TGN can be tailored to the specific location of the TGN. For example, a TGN situated in an intersection with four lane roads may have a greater signal strength and/or radius of transmission in comparison to a TGN situated in an intersection with single lane roads. In the former case, the increased signal strength can allow the transmission to reach across the wider intersection. Also, a stronger signal strength can be used in a situation, such as high speed areas for example, where drivers or other TNEs may require greater reaction time. The stronger signal can provide information to the drivers while they are relatively distant from the TGN so that the drivers can react to changing traffic. In the latter case of the single-lane road, the relatively lower signal strength can reduce energy use and reduce the possibility that the transmission will be received in other, adjacent areas where the transmission may not be applicable or in areas where greater reaction time is not needed.

In an embodiment, a TGN (or a TNE) can identify itself by broadcasting or communicating metadata that includes identifying information. For example, a TGN may broadcast a unique identifier associated with the TGN, a location, and/or information about the type of TGN (e.g. whether the TGN is a stop-sign, a construction sign, a hazard sign). The metadata can also contain other information that identifies an operating state of the TGN. Such information can include, but is not limited to: data identifying whether the TGN is operating correctly, data containing results of a self-test, data about a battery or power level of the TGN, data about a network or communication status of the TGN, data about an error condition, and the like.

Additionally or alternatively, the frequency of the TGN's wireless communication can be changed to identify the type of TGN sending the information. For example, stoplights TGNs may use one frequency band while construction signs may use another. The THE receiving the signal may differentiate the type of TGN (and thus the type of data being received) by identifying the frequency band used. Additionally or alternatively, the frequency used can affect the range of the transmission. A lower frequency transmission can be used, for example, to broadcast data over a further range from the TGN while a higher frequency transmission can be used to broadcast information within a shorter range of the TGN.

Different frequencies can also be used by the same TGN to differentiate the type of data being transmitted. For example, a TGN may send general information over one frequency and emergency information over another.

System 200 also includes a computing center 208 in communication with network 202. Computing center 208 may be a computer, multiple computers, a server, an array of servers, a data center, a database, etc. In an embodiment, computing center 208 may send information to and receive information from the TGNs and TNEs. Computing center 208 may also coordinate action between TGNs. For example, if vehicle TNE 114 reports that it has been in an accident, it may send such information to computing center 208. Computing center 208 may then relay the information to stoplight TGN 102 with instructions to alter the way the traffic light is operating in order to safely route traffic in the area of the accident or to stop traffic so that emergency vehicles can approach the accident. Computer center 208 may also contact emergency services such as police, fire, and rescue to inform them of the accident.

In another embodiment, if computing center 208 is not present, vehicle TNE 114 may communicate information about the accident directly to stoplight TGN 102 (or to another TGN), which can then alter its operation accordingly, and communicate the information to other TNEs and TGNs in the area. For example, if vehicle TNE 114 reports that it has been in an accident, stoplight TGN 102 may change mode and begin to blink red in all directions to slow other traffic in the area. Stoplight TGN 102 may also automatically contact emergency services (fire, rescue, etc.) via network 202 once the accident is reported to stoplight TGN 102.

Figure 3:
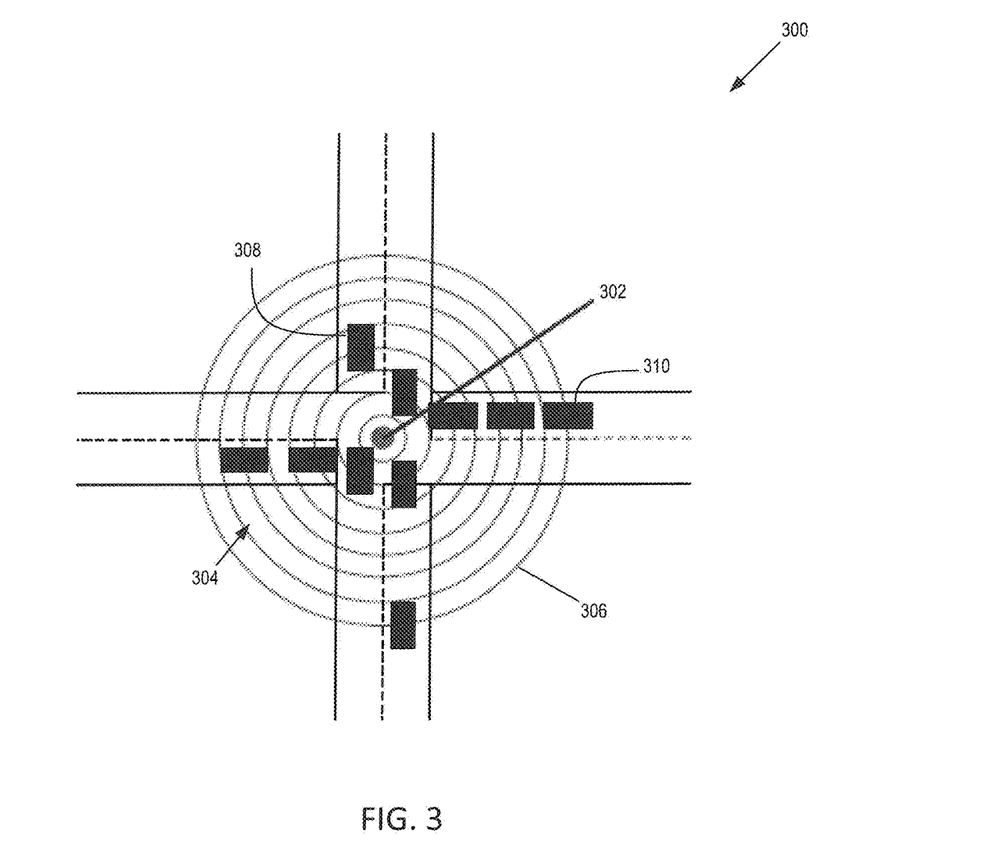
FIG. 3 is an overhead view of an intersection including a traffic guidance node.

FIG. 3 is an overhead view of a street-scape 300. A stoplight TGN 302 is situated in the center of intersection 304. As shown by concentric circles 306, stoplight TGN 302 may have an omnidirectional transceiver that can wirelessly transmit and/or receive information in all directions. This may allow stoplight TGN 302 to communicate with north- and south-bound vehicle TNEs 308, as well as with east- and west-bound TNEs 310. In addition to the wireless transceiver, TGN 302 may also have a wired transceiver or network adapter with which it can communicate with other TGNs.

To expand on this example, stoplight TGN 302 may broadcast information via the wireless transceiver indicating that the stoplight is red for east- and west-bound traffic, and that the stoplight is green for north- and south-bound traffic. The vehicle TNEs, which, due to GPS capabilities, may be aware of their position and direction when approaching stoplight TGN 302, may receive this information and display it to a driver. If the vehicle is autonomous, the vehicle may use the information to slow down in the case of a red light or continue at speed in the case of a green light, for example.

Stoplight TGN 302 may also have a wired transceiver or network adapter with which it can communicate with other TGNs. For example, if stoplight TGN 302 detects a traffic accident in its local vicinity, it can transmit information about the accident to other TGNs (e.g. via wired network) along the same roadway, which can then provide information about the accident (via wireless transmission) to TNEs on the roadway that are approaching the site of the accident. If the other TGNs are stoplights (or other navigation aids that can alter traffic patterns), the other TGNs may re-direct or re-route traffic around the accident, or may stop or slow traffic in the area around the accident. Stoplight TGN 302 can also contact emergency services via the wired network adapter.

Figure 4:
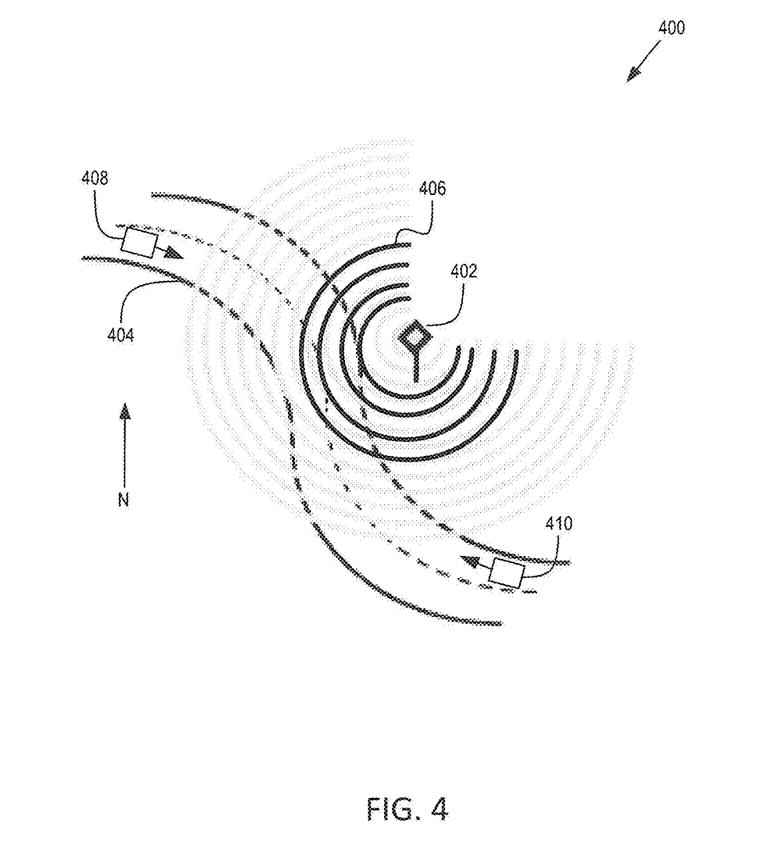
FIG. 4 is an overhead view of a roadway including a traffic guidance node.

FIG. 4 is an overhead view of a street-scape 400. As seen in FIG. 4, a hazard sign TGN 402 is situated adjacent to a roadway 404. Hazard sign TGN 402 may have a directional transceiver that can direct wireless transmissions toward roadway 404, as shown by concentric lines 406. By directing transmissions toward roadway 404, the TGN may enhance the signal (e.g. the signal power) in the area of roadway 404 to facilitate reception by TNEs on roadway 404. In addition, the directed transmission can decrease the chance that the signal will be received by TNEs for which the signal is not intended. For example, assume the hazard sign TGN 402 provides hazard information only for roadway 404. By directing the signal toward roadway 404 and away from other, adjacent roadways or traffic areas, hazard sign TGN 402 can prevent or reduce the possibility that information from hazard sign TGN 402 will be received by a TNE on another roadway for which the information may not apply.

In an embodiment, hazard sign TGN 402's transceiver may have a directed transmission antenna so that wireless transmissions sent from hazard sign TGN 402 can be directed to a particular area, and an omnidirectional antenna for receiving transmissions so that hazard sign TGN 402 can receive transmissions for any TGN or TNE in the surrounding area. In another embodiment, hazard sign TGN 402 may have an omnidirectional antenna for transmitting data and a directed antenna for receiving data. In other embodiments, the transceiver may have omnidirectional antennas for both transmitting and receiving or directed antennas for both transmitting and receiving.

Hazard sign TGN 402 may also have a wired transceiver or network adapter with which it can communicate with other TGNs. For example, if hazard sign TGN 402 detects a traffic accident in its local vicinity, hazard sign TGN 402 can transmit information about the accident to other TGNs (e.g. via wired network) along the same roadway, which can then provide information about the accident (via wireless transmission) to TNEs on the roadway that are approaching the site of the accident.

If hazard sign TGN 402 has directed antennas for both transmitting and receiving, the antennas may be pointed in the same direction or in different directions depending on the traffic in the area. For example, referring to FIG. 4, it may be advantageous in certain circumstances to inform an east-bound vehicle TNE 408 of west-bound traffic such as vehicle TNE 410 prior to the traffic meeting along roadway 404. Accordingly, hazard sign TGN 402 may have a receiver antenna (or other type of sensor) pointing to the south-east in order to receive information about vehicle TNE 410, and a transmitter antenna (or other type of communication device) pointing to the north-west to send information about vehicle TNE 410 to vehicle TNE 408.

In embodiments, a TGN may communicate information specific to the direction of traffic. Assume, for example, an intersection has a two-way stop that requires north- and south-bound vehicles to stop, but allows east- and west-bound vehicles to go through the intersection without stopping. A TGN at the intersection may transmit information to north- and south-bound vehicles informing them that they must stop. The stop-sign may also transmit information east- and west-bound vehicles that informs the vehicles of the intersection, but not require them to stop. In an embodiment, the TGN may have directional transceivers to transmit certain information to east- and west-bound vehicles, and to transmit other information to north- and south-bound vehicles. Additionally or alternatively, the TGN may transmit metadata that identifies the information for specific types of traffic. For example, the TGN may tag the information in the transmission for north- and south-bound traffic or for east- and west-bound traffic in the area of the TGN, for example. Although north-, south-, east-, and west-bound traffic is used as an example, it will be apparent that any direction and/or location can be used to send information specific to particular types of traffic. In other embodiments, information can be tagged or directed to traffic having a particular speed; a particular location; a particular direction; to particular types of TNEs; to particular types of vehicles such as cars, trucks, or bicycles; etc.

Figure 5:
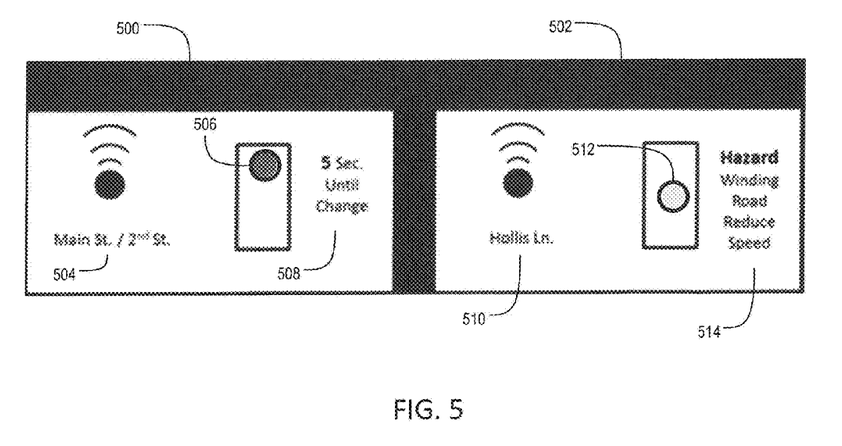
FIG. 5 is an image of a computerized display.

Referring now to FIG. 5, TNEs may include one or more displays 500, 502 so that a user can view information received by the TNE. Display 500 shows the status of a stoplight TGN, such as stoplight TGN 102 in FIG. 1. In this case, the display shows the location 504 of the stoplight at Main St. and 2nd St, the current state of the stoplight (a red light) by displaying red ball 506, and a status 508 of the stoplight that displays the time until the stoplight changes (5 seconds, in this example).

Display 502 shows the status of a hazard sign TGN, such as hazard sign TGN 402 in FIG. 4. Display 502 includes a location 510 of the hazard sign at Hollis Ln., as well as information from the hazard sign TGN. In this example, the information from the hazard sign TGN 402 is displayed as a yellow warning light 512 and textual information 514 informing the user of a winding road and suggesting that the user reduce speed.

If the TNE is a motor vehicle, displays 500 and 502 may be shown on an in-dash display or windshield display of the motor vehicle. Alternatively, if the TNE is a bicycle or pedestrian, displays 500 and 502 may be shown on a bicycle computer display, a smart-phone display, wrist-watch display, eyeware display, helmet visor or other headware display, or the like. In embodiments, the amount and type of information displayed on display 500 and/or 502 may vary depending on the type of TNE. The pedestrian TNE, for example, will receive information relevant to crossing the road with stopped traffic rather than the "red stop" or "green go" information that the vehicle TNE receives. The bicycle TNE will receive and display displayed information for nearby and approaching vehicles which constitute safety hazards to the bicycle. The vehicle TNE, alternatively, will receive and display information on nearby bicycles to assist in avoiding collisions.

TGNs may send and receive information not only to and from TNEs, but also to and from other TGNs. For example, if a stoplight TGN detects a traffic accident on the road (or is informed of a traffic accident by a TNE), the TGN may transmit information about the traffic accident to other TGNs on the same roadway or in the same area. The first TGN and the other TGNs may then change state and/or direct or stop traffic so that the accident does not cause additional damage or impede traffic. The series of TGNs can also direct traffic away from the scene of the accident so that emergency vehicles can more easily access the accident.

Similarly TNEs can also communicate directly with other TNEs. For example, a TNE traveling on a particular roadway can inform other TNEs of its presence and its activity, such as whether the TNE is braking, accelerating, turning, etc. The other TNEs can display this information to a driver and/or adjust their path of travel based on the information received. Since the transmitted TNE information will include the broadcasting TNE's own position, speed, road, direction of travel, TNE type, etc., the TNEs receiving the information will give appropriate priority to the incoming data. A heightened priority for TNE navigation and collision avoidance, for example, is accorded to data received from closest TNEs traveling on the same road or upcoming cross roads along the direction of travel.

In embodiments, TGNs may transmit standard information relating to the type of TGN. For example, if the TGN is a stop light, the TGN may transmit data and standard information associated with stop light functions. Such information includes, but is not limited to the current state of the stoplight (e.g. red, yellow, or green), as well as timing related to when the stoplight will change. A stop light can also transmit other, less common, information about its state including, but not limited to, whether the stop light is a blinking red or blinking yellow light. As another example, a stop sign may transmit information informing TNEs of the presence of the stop sign and that the TNE should stop, and a yield sign may transmit information about the presence of the yield and that the TNE should be prepared to yield to other traffic.

Various types of standard information can be transmitted by a TGN, depending upon the type of TGN. Such information includes, but is not limited to:

A traffic light providing information about the current state of the traffic light, directional or arrow lights, and/or timing of changes of the light.

A speed limit sign providing information about the current speed limit or a cautionary speed limit.

A stop sign providing information about the location of the stop intersection.

A yield sign providing information about the location of the yield intersection.

A hazard sign providing information about hazardous driving or road conditions such as, alone or in combination: the presence of a curving road, limited visibility, narrow road width, changing road condition, steep grade, road or bridge clearance limits, weight limit for a bridge crossing, and the like.

A train crossing sign providing information about whether a stop is required and/or when a train will be arriving. In an embodiment, the crossing sign can be coupled with a movable gate to stop traffic from crossing the train tracks, the proximity of a construction zone, etc.

A street-crossing sign providing information to pedestrians instructing them to cross the street or wait.

A highway or roadway informational sign providing information about any of the following, alone or in combination: bridge and tunnel clearance and width, bridge or roadway weight restrictions, a highway exit or entrance ramp, beginning or ending of a passing zone, a school zone, children in the area, a blind or deaf person in the area, a pedestrian crossing, proximity of bicycle lane, a wildlife crossing zone, an exit approaching or exit closed status, a suggested speed limit for an exit- or on-ramp, a merge, a bicycle lane, a construction zone, information about right of way, and the like.

In addition to standard information, a TGN (or a TNE) can provide additional or enhanced traffic guidance information. The additional information can include, but is not limited to: traffic light timing, a GPS position of the TGN, a unique identifier of the TGN and/or of any nearby TNEs, a type of any nearby TNEs (e.g. vehicle, bicycle, pedestrian, etc.), and the like. The additional information can also include a measured speed, position, and/or direction of the TNE or of any nearby TNEs. The speed, position, and direction can be transmitted by the TNE, or may be measured by the TGN. The additional information may also include a measurement of traffic flow and speed in a particular direction of travel near the TGN, an actual or estimated delay time through an intersection or path of travel near the TGN, a number of open lanes, road closure information, presence of a stalled or stopped TNE, indicator of an emergency condition, proximity of emergency vehicles, warning of an imminent collision, etc. The TGN or TNE detects heightened probability of imminent collision when it finds the separation between two or more relatively proximate TNEs rapidly diminishing. The position and separation information in this case may be measured and calculated by TNEs and transmitted to TGNs or this information may be measured and calculated by the TGNs.

In embodiments, communication between TGNs and TNEs may comprise data for coordinating travel between autonomous vehicles. For example, autonomous TNEs can communicate with each other to confirm or negotiate right-of-way; to confirm a turn, change of lanes, or change in direction; to confirm changes in speed and stops; etc.

In certain embodiments, TNEs can communicate directly with other TNEs in order to coordinate traffic flow. In particular, such communication can aid the navigation of autonomous vehicles. For example, TNEs can communicate intent to make a turn, intent to travel a particular path along a roadway or series of roadways, acknowledgment of a turn, negotiation of right of way, intent to stop, acknowledgement of a stop, current speed, etc. Just as human drivers will "make eye contact" with each other on occasion or, more explicitly, one human driver will make a hand signal to another driver or to a pedestrian to indicate "you go through the intersection first and I will wait," autonomous vehicles may clarify such intentions among each other. As another example, the directional signal in current use enables the human driver to notify other drivers and pedestrians of the first driver's intent to turn. TNEs will communicate this same intent through other wireless communication. TNEs will also communicate the absence of an upcoming turn. That is, the vehicle TNE will communicate its intent to drive straight through an intersection by deliberate wireless signal rather than simply by the absence of a directional signal.

TNEs can also communicate a distress status if, for example, the TNE is stopped, in distress, or may cause a hazard to other vehicles' navigation. The distress status can be picked up and propagated by other TNEs and by TGNs. In an embodiment, the distress status can be sent (either directly from the TNE in distress or propagated by TGNs and TNEs that have received the distress signal) to a nearest emergency service station such as a tow station, a police or fire station, an emergency medical station, etc.

For example, the distress signal may include a GPS location of the TNE in distress. TNEs and TGNs can route the distress signal to some or all emergency service stations within a pre-defined geographical area. The pre-defined area may be defined by a town, a section of a city, a county, etc. When an emergency service station receives the distress signal, it can check whether the GPS location is within its jurisdiction. If so, the emergency service station can dispatch emergency vehicles to the site, and inform other nearby emergency service stations and TGNs of the dispatch.

For an emergency medical situation in an autonomous vehicle TNE, a passenger will have the ability to signal a medical emergency to the TNE. In addition to broadcasting the distress signal to other TNEs and to TGNs, the autonomous vehicle TNE will know its own GPS location and the locations of proximate medical facilities. The autonomous vehicle TNE will then take the passenger(s) directly to the closest appropriate medical facility.

Figure 6:
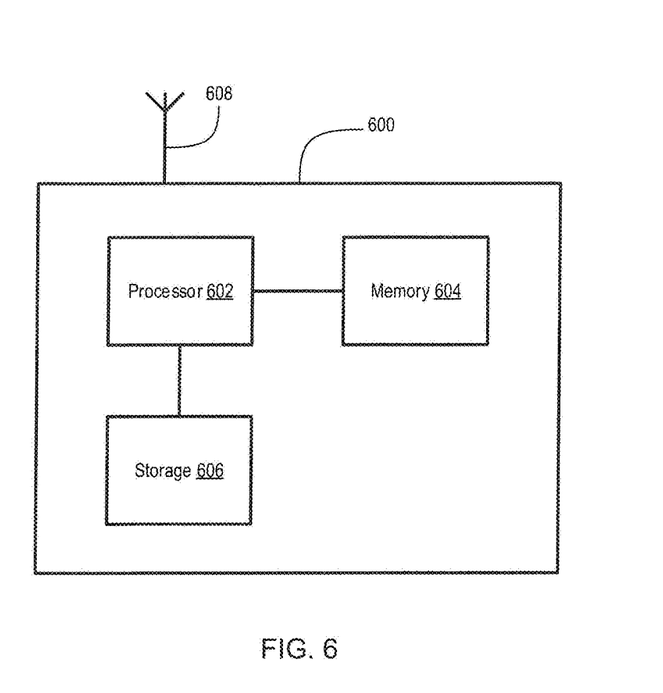
FIG. 6 is a block diagram of a computing device.

Referring to FIG. 6, a computing device 600 includes a processor 602, a memory 604, a storage device 606, and a transceiver 608. In embodiments, the TGNs and TNEs above may comprise a computing device such as computing device 600. The processor may be any type of computer processor chip or circuit that can execute software instructions. Such processors include desktop processors, laptop processors, mobile device processors, microprocessors, etc. Storage device 606 may be any type of hardware storage device that can store data and/or computer instructions including, but not limited to, a hard drive, a flash drive, a CD or DVD, a solid state hard drive, a ROM, etc. The storage device 606 may be located in a data center that provides cloud storage services. Memory 604 may be any type of volatile hardware memory that can store software instructions including such as a RAM or the like. Transceiver 608 may be a wired, optical fiber, or wireless transceiver such as a wireless network adapter, a Bluetooth® adapter, a radio transmitter, etc. Transceiver 608 may comprise an antenna to transmit and/or receive transmissions, separate antennas to transmit and/or receive transmissions, and/or circuits, processors, or software to implement a network or transmission stack or to otherwise facilitate communication. Transceiver may also comprise an RFID antenna or tag, which can transmit or receive information when activated by an external energy source, and which can provide a unique identifier to identify the computing device, TGN, or TNE.

In an embodiment, processor 602 may read and execute software instructions stored in memory 604 and/or storage device 606. The instructions may cause processor 602 to perform instructions and/or provide any or all features as described above, including features for transmitting and/or receiving data via transceiver 608.

If computing device 600 is installed in a TGN, computing device 600 may perform functions associated with the TGNs as described above. If computing device 600 is installed in a TNE, computing device 600 may perform functions associated with the TNEs as described above. One skilled in the art will recognize that computing device 600, as described in this document, is a generic computing device. Additionally or alternatively, specific computing devices, including custom computers, ASICs, hardware circuit implementations, or other computing devices may be installed in the TGNs and TNEs to effectuate some or all of the functions and features of the TGNs and TNEs.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that the scope of the patent should not be limited to the described embodiments but rather should be limited only by the spirit and scope of the following claims. All references cited herein are hereby incorporated herein by reference in their entirety.

What is claimed is:

1. A system comprising:
   one or more traffic guidance nodes comprising:
      a traffic guidance indicator;
      a receiver to receive information about local traffic;
      one or more sensors to detect local traffic activity and generate information about local traffic activity;
      a memory to store the information about local traffic; and
      a transmitter to broadcast the information about local traffic; and
   one or more mobile traffic navigating entities comprising:
      a receiver to receive the information from the one or more traffic guidance nodes when the traffic navigating entity is within a proximity of the one or more traffic guidance nodes;
      one or more sensors to detect local traffic activity and generate information about local traffic activity;
      a memory to store the information about the local traffic activity;
      a transmitter to send the information about the local traffic activity to other mobile traffic navigating entities and to the one or more traffic guidance nodes;
   wherein the one or more traffic guidance nodes transmit updated information about the local traffic to the one or more mobile traffic navigating entities when the one or more mobile traffic navigating entities are within a range of the one or more traffic guidance nodes.

2. The system of claim 1 wherein the traffic guidance node comprises a structure for providing visual traffic directions to a driver.

3. The system of claim 2 wherein the structure is a traffic sign.

4. The system of claim 3 wherein the information about local traffic transmitted by the traffic guidance node corresponds to visual information provided by the traffic sign.

5. The system of claim 2 wherein the structure is a traffic signal.

6. The system of claim 5 wherein the local information transmitted by the traffic guidance node corresponds to a current state of the traffic signal.

7. The system of claim 1 wherein the transmitters are wireless transmitters.

8. The system of claim 1 wherein the sensors include one or more of: a sensor for detecting presence of a traffic navigating entity; a sensor for detecting a vehicle, a sensor for detecting speed of a traffic navigating entity, a sensor for detecting speed of a vehicle; a sensor for detecting direction of a traffic navigating entity, a sensor for detecting direction of motor vehicles; and a sensor for detecting presence of a pedestrian.

9. The system of claim 1 wherein the traffic navigating entity is a processing device that can be installed in a motor vehicle or carried by or attached to a pedestrian or bicyclist.

10. The system of claim 9 wherein at least one of the traffic navigating entities includes a human interface device to communicate the local traffic activity to a user of the processing device.

11. The system of claim 10 wherein the human interface device is a screen installed in a motor vehicle.

12. The system of claim 1 wherein the traffic navigating entities are configured to update the information about local traffic activity with the information about local traffic received from the traffic guidance nodes.

13. The system of claim 1 wherein the traffic guidance nodes are configured to update the information about local traffic with the information about local traffic activity received from the traffic navigating entities.

14. The system of claim 1 wherein the information about local traffic and/or the information about local traffic activity includes information about traffic hazards, a current state of a traffic signal, a future state of a traffic signal, traffic congestion; proximity of emergency vehicles, or a combination thereof.

15. The system of claim 1 wherein at least one of the one or more traffic guidance nodes is stationary.

16. The system of claim 1 further comprising one or more computer centers comprising computing devices configured to coordinate communication between the traffic guidance nodes and the traffic navigating entities and to direct operation of one or more of the traffic guidance nodes.

17. The system of claim 1 wherein at least one of the one or more of the traffic guidance nodes is configured to alter a state of the traffic guidance indicator in response to detecting the local traffic and/or in response to a transmission received from a traffic navigating entity.

18. The system of claim 1 wherein the information broadcasted by the traffic guidance node includes a unique identifier of the traffic guidance node.

19. The system of claim 1 wherein the information broadcasted by the traffic guidance node includes a unique identifier of a traffic navigating entity.

20. The system of claim 1 wherein the information transmitted by the traffic navigating entity includes a unique identifier of the traffic navigating entity and/or a unique identifier of a traffic guidance node.

21. A system comprising:
   one or more traffic guidance nodes comprising:
      a traffic guidance indicator;
      a receiver to receive information about local traffic;
      one or more sensors to detect local traffic activity and generate information about local traffic activity;
      a memory to store the information about local traffic; and
      a transmitter to broadcast the information about local traffic; and
   one or more mobile traffic navigating entities comprising:
      a receiver to receive the information from the one or more traffic guidance nodes when the traffic navigating entity is within a proximity of the one or more traffic guidance nodes;
      one or more sensors to detect local traffic activity and generate information about local traffic activity;
      a memory to store the information about the local traffic activity; and
      a transmitter to send the information about the local traffic activity to other mobile traffic navigating entities and to the one or more traffic guidance nodes;
   wherein the one or more traffic guidance nodes transmit updated information about the local traffic to the one or more mobile traffic navigating entities when the one or more mobile traffic navigating entities are within a range of the one or more traffic guidance nodes;

wherein the transmitter of at least one of the one or more traffic guidance nodes is a directional transmitter.

22. The system of claim 21 wherein the directional transmitter is positioned to transmit the information about the local traffic toward a roadway having traffic affected by the information and away from a roadway having traffic not affected by the information.

23. A system comprising:
one or more traffic guidance nodes comprising:
a traffic guidance indicator;
a receiver to receive information about local traffic;
one or more sensors to detect local traffic activity and generate information about local traffic activity;
a memory to store the information about local traffic; and
a transmitter to broadcast the information about local traffic; and
one or more mobile traffic navigating entities comprising:
a receiver to receive the information from the one or more traffic guidance nodes when the traffic navigating entity is within a proximity of the one or more traffic guidance nodes;
one or more sensors to detect local traffic activity and generate information about local traffic activity;
a memory to store the information about the local traffic activity; and
a transmitter to send the information about the local traffic activity to other mobile traffic navigating entities and to the one or more traffic guidance nodes;
wherein the one or more traffic guidance nodes transmit updated information about the local traffic to the one or more mobile traffic navigating entities when the one or more mobile traffic navigating entities are within a range of the one or more traffic guidance nodes;
wherein at least one of the one or more traffic navigating entities is configured to request a change in state of the traffic guidance indicator of at least one of the one or more traffic guidance nodes.

* * * * *